United States Patent [19]
Pearson et al.

[11] Patent Number: 6,044,695
[45] Date of Patent: Apr. 4, 2000

[54] APPARATUS AND METHOD FOR DETECTING CONTAMINANTS ON THE SURFACE OF A CARD

[75] Inventors: Gary L. Pearson, Rosemount; Grant Wurdell, St. Louis Park; Timothy P. Courteau, St. Paul, all of Minn.

[73] Assignee: DataCard Corporation, Minneapolis, Minn.

[21] Appl. No.: 08/922,686

[22] Filed: Sep. 2, 1997

[51] Int. Cl.⁷ .............................. G01B 5/28; B41F 33/00
[52] U.S. Cl. ................................................. 73/104
[58] Field of Search ........................ 73/104, 105

[56] References Cited

U.S. PATENT DOCUMENTS

| | | | |
|---|---|---|---|
| 3,194,061 | 7/1965 | Sorenson et al. | 73/104 |
| 3,596,286 | 7/1971 | Coliz et al. | 346/86 |
| 4,126,036 | 11/1978 | Nilan et al. | 73/105 |
| 4,213,331 | 7/1980 | Porter | 73/105 |
| 4,402,218 | 9/1983 | Engel | 73/104 X |
| 4,403,419 | 9/1983 | Graves | 73/105 X |
| 4,513,613 | 4/1985 | Dervez-Burnz et al. | 73/159 |
| 4,586,712 | 5/1986 | Lorber et al. | 273/149 R |
| 4,821,426 | 4/1989 | Angove | 33/523 |
| 4,898,037 | 2/1990 | Allen et al. | 73/104 X |
| 4,950,877 | 8/1990 | Kurihara et al. | 235/480 |
| 5,312,536 | 5/1994 | Pai et al. | 204/401 |
| 5,525,417 | 6/1996 | Eyler | 442/382 |

FOREIGN PATENT DOCUMENTS

| | | |
|---|---|---|
| 31 42 823 A1 | 11/1982 | Germany . |
| 32 45 403 A1 | 9/1983 | Germany . |
| 4114728 | 11/1992 | Germany ............... 73/104 |
| 44 18 801 A1 | 12/1994 | Germany . |
| 96845 | 5/1987 | Japan ..................... 73/104 |
| 6614 | 1/1993 | Japan . |
| 2090195 | 7/1982 | United Kingdom . |

*Primary Examiner*—Thomas P. Noland
*Attorney, Agent, or Firm*—Merchant & Gould P.C.

[57] ABSTRACT

An apparatus and method for detecting potentially damaging contaminants on the surfaces of a plastic card, such as a credit card, an identification card, and the like, prior to a thermal printing operation being performed on the card. The apparatus includes a roller assembly including a first, driven, rotatable roller and a second, floating, rotatable roller parallel to the first roller. The card is directed between the first and second rollers so that the first roller is engageable with one side surface of the card and the second roller is engageable with the opposite side surface of the card. The second roller is supported in a manner to permit the second roller to pivot about a fixed axis when either one of the first and second rollers encounters a contaminant on one of the side surfaces of the card. An encoder is linked to the second roller for collecting data on the movement of the second roller as the card travels between the first and second rollers.

19 Claims, 6 Drawing Sheets

APPARATUS AND METHOD FOR DETECTING CONTAMINANTS ON THE SURFACE OF A CARD

FIELD OF THE INVENTION

The present invention pertains to a particle detection system for hardware protection on a card processing machine. In particular, the present invention pertains to an apparatus and method for detecting particulate contaminants on the surfaces of a card, prior to a thermal printing operation on the card.

BACKGROUND OF THE INVENTION

Data and/or graphic images are often placed on plastic cards, such as credit cards, identification cards and the like, by thermal printing. In thermal printing, which is inherently a contact form of printing, a printhead makes intimate contact with a ribbon and the card in order to print the desired data and/or graphic image(s) on the card.

Often times, a card may contain particulate contaminants on one, or both, of its generally planar side surfaces. These contaminants may be a result of the card production techniques, or improper care and storage of card stock. As a result, the card is often cleaned, prior to printing, in order to remove the contaminants. While cleaning the card removes loose contaminants, solidly affixed contaminants may remain. These remaining contaminants are a threat to the printhead because as the printhead makes contact with a contaminant during the printing operation on the card, the resistive elements on the printhead may be damaged, rendering portions of the printhead inoperable. Since printhead replacement is an expensive and time consuming operation, it would be desirable to prevent contact between a printhead and a card that has contaminants on its surfaces.

SUMMARY OF THE INVENTION

This invention provides an apparatus and method for detecting potentially damaging contaminants on the surfaces of a plastic card, such as a credit card, an identification card, and the like. The present invention affords a measure of protection from affixed particles which cleaning alone cannot, by detecting contaminants which remain on the card after cleaning but before printing. A card that is found to have a contaminant thereon is rejected, i.e. not allowed to pass to the printer for the printing operation, thus preventing contact between the printhead and damaging contamination found on the card. Cards which are rejected are transported to a reject hopper in an output tray of a card processing machine in which the detection apparatus is utilized.

The particle detection apparatus of the present invention is for a linear card path, in which the card is guided edgewise through the apparatus. The apparatus includes a roller assembly including a first, driven, rotatable roller and a second, floating, rotatable roller parallel to the first roller. The card is directed between the first and second rollers so that the first roller is engageable with one side surface of the card and the second roller is engageable with the opposite side surface of the card. The second roller is supported in a manner to permit the second roller to pivot about a fixed axis when either one of the first and second rollers encounters a contaminant on one of the side surfaces of the card. An encoder is linked to the second roller for collecting data on the movement of the second roller as the card travels between the first and second rollers. The card is guided to and from the rollers by a guide track system which orients the card so that the plane of the card is substantially parallel to the axes of the rollers. The guide track system comprises pairs of spaced guide tracks located upstream and downstream of the rollers. Each of the pairs of guide tracks includes a flat bottomed slot with the channels in each pair facing each other and spaced a card width apart, bottom to bottom, thus providing a captive guide for the card to pass through.

In a first embodiment of the invention, the second roller is rotatably supported at each of its ends by pivot arms that are themselves fixedly connected to a pivot shaft, so as to constrain the pivoting movement of the second roller to an arc about the axis of the pivot shaft. A spacer bar extends between the pivot arms, and a doctor blade is secured to the spacer bar for removing material from the surface of the second roller. The pivot shaft is linked to the encoder through an elongate gear, such that movement of the pivot shaft, and thus the second roller, is transmitted to the encoder. The second roller is biased towards the first roller and against the card by a coil spring disposed around the pivot shaft, so as to maintain contact between the card and the rollers.

In another embodiment of the invention, the second roller is rotatably supported at each of its ends by a C-shaped support member. The support member includes a central region having an aperture for receiving a pivot pin connected to an elongate member. The elongate member is pivoted at one end to a stationary portion of the apparatus, and engages with the encoder at its opposite end. Thus, the elongate member allows the second roller to pivot about a fixed axis when a contaminant is encountered by one of the rollers, with the pivoted connection between the central region of the support member and the elongate member maintaining the second roller parallel with the first roller as the second roller pivots.

The invention further includes a method for detecting contaminants on the side surfaces of a generally planar card. The method includes directing the card between a roller assembly including a first, driven, rotatable roller and a second, rotatable, pivotally supported roller parallel to the first roller, such that the first roller is engageable with one side surface of the card and the second roller is simultaneously engageable with the opposite side surface of the card, and the second roller is able to pivot as the first and second rollers engage the respective side surfaces. The pivoting movements of the second roller are transmitted to a data collector so as to collect data representing the pivoting movement of the second roller as the first and second rollers travel over the entire length of the side surfaces of the card. After the data is collected, it is analyzed to determine whether the collected data indicates the presence of a contaminant on the side surfaces of the card. The analyzing step includes filtering the collected data to eliminate noise and includes calculating a mean of the filtered data. A statistical variance of the filtered data is calculated using the calculated mean, and the standard deviation of the filtered data is calculated using the calculated statistical variance, with the value of the standard deviation determining the presence of a contaminant, thus indicating that the card should be rejected.

These and various other advantages and features of novelty which characterize the invention are pointed out with particularity in the claims annexed hereto and forming a part hereof. However, for a better understanding of the invention, its advantages and objects attained by its use, reference should be made to the drawings which form a further part hereof, and to the accompanying description, in which there is described a preferred embodiment of the invention.

DETAILED DESCRIPTION OF THE PREFERRED EMBODIMENT

Figure 1:
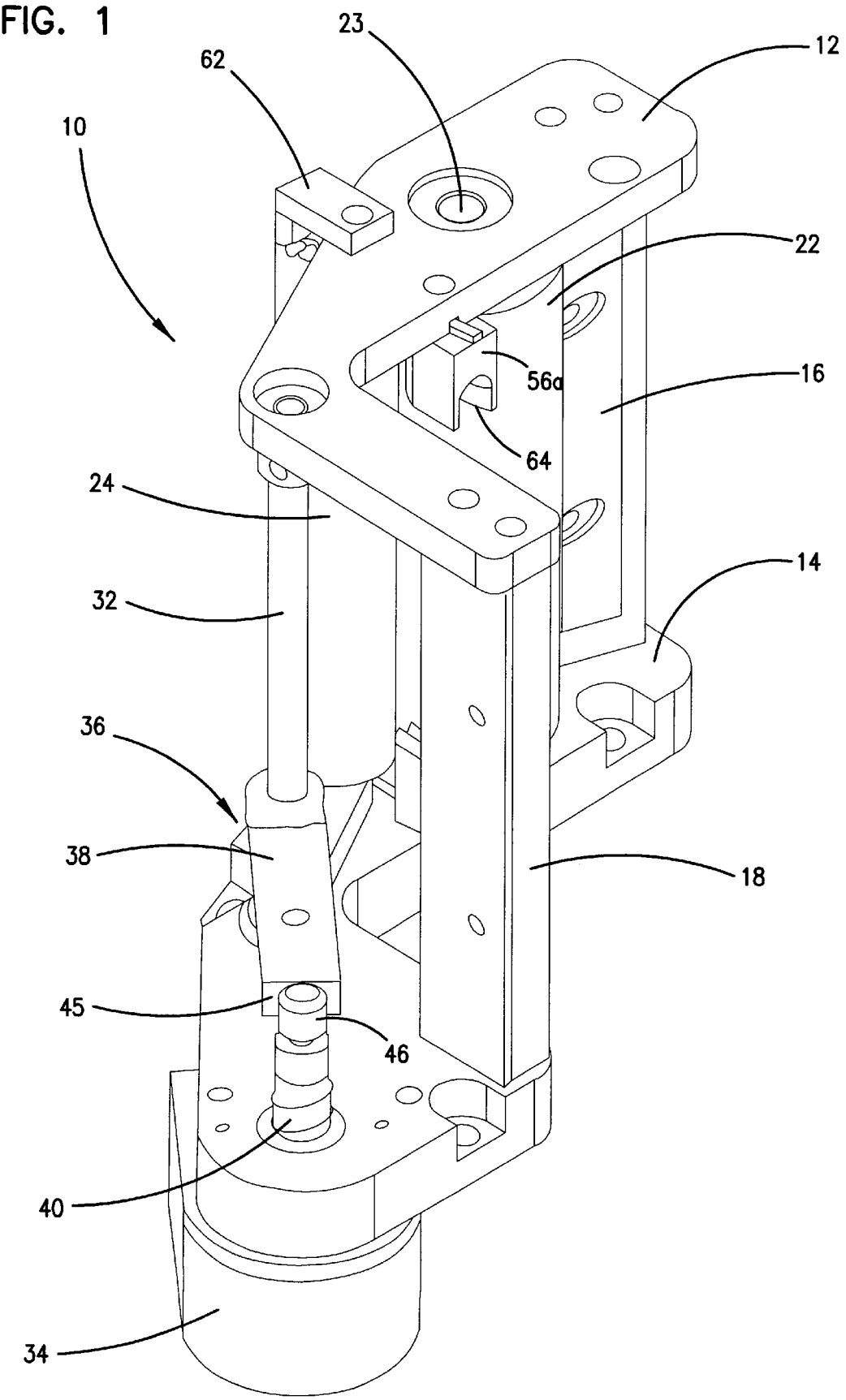
FIG. 1 is an elevated perspective view of the detection apparatus showing a portion of the front of the apparatus.

Referring now to the drawings, wherein reference numbers correspond to same parts throughout the views, the particle detection apparatus is generally referred to by numeral 10. The apparatus 10 is used in a card processing machine (not shown) of a type generally known in the art for placing data and/or graphic images on plastic cards, such as credit cards, identification cards, and the like, by thermal printing. The cards are generally planar, and include two side surfaces. The apparatus is used to detect particulate contaminants on the side surfaces of the cards as the cards move through the apparatus. The apparatus is located upstream of a printhead in the card processing machine such that the cards encounter the apparatus before a printing operation on the cards.

As shown in FIGS. 1–4, the apparatus 10 includes an upper support member 12 and a lower support member 14 separated by spacer members 16,18 extending between the members 12,14 at each end, and mounted in a stationary manner within the card processing machine. As used herein, the terms "upper" and "lower" are in reference to the orientation of the apparatus as shown in the figures (i.e. the plane of the card being oriented vertically). However, it should be realized that the apparatus could have other orientations, such that the plane of the card is horizontal or any angle between vertical and horizontal.

Mounted between the support members 12,14 is a roller assembly 20 which includes a first roller 22 and a second roller 24 mounted generally parallel with the spacer members 16,18, and rotatable with respect to the support members 12,14. The first roller 22 is mounted on a shaft 23 which is rotationally supported at each end thereof by the support members 12,14. The roller 22 is driven in rotation by a motor (not shown) which is drivingly connected in an appropriate manner to the shaft 23. The drive motor is preferably an electric motor, although a hydraulic or pneumatic motor can be used if desired, and controlled by the control system of the card processing machine. The roller 22 could also be driven in rotation through a suitable drive connection, such as by drive assembly 19, between the shaft 23 and a motor located within the card processing machine. The second roller 24 is mounted parallel with, and closely adjacent to, the first roller 22 so as to form a roller nip therebetween, and is supported for rotation on a shaft (not shown), although it is undriven. Each roller is hard-surfaced and disposed tangent to the direction of the card movement through the apparatus such that as the card passes between the two rollers, the roller 22 contacts one planar side surface of the card and the roller 24 contacts the opposite planar side surface of the card. During operation of the apparatus, as a card is introduced between the rollers, the driven roller 22 frictionally engages one side surface, thus forcing the card between the rollers, while rolling along the one side surface of the card. Simultaneously, the roller 24 rolls along the opposite side surface as the card moves between the rollers. In this manner, the rollers simultaneously contact the side surfaces of the card and roll along the side surfaces in intimate contact therewith. The length of each roller 22,24 is greater than the height of the card, such that the rollers contact the entire height of the card.

Figure 2:
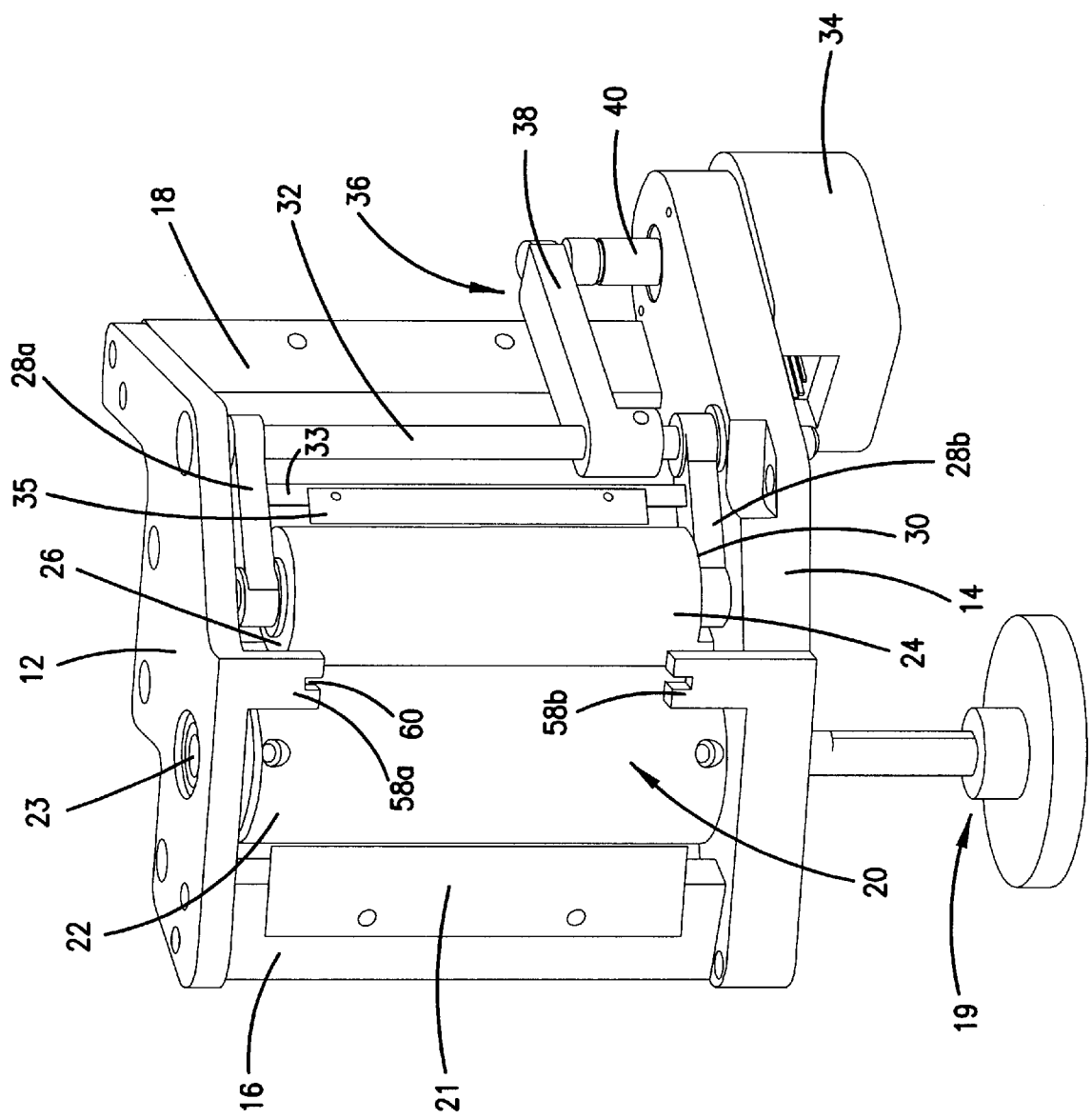
FIG. 2 is a rear view of the apparatus showing the outlet between the two rollers and the outlet guide tracks.
Figure 3:
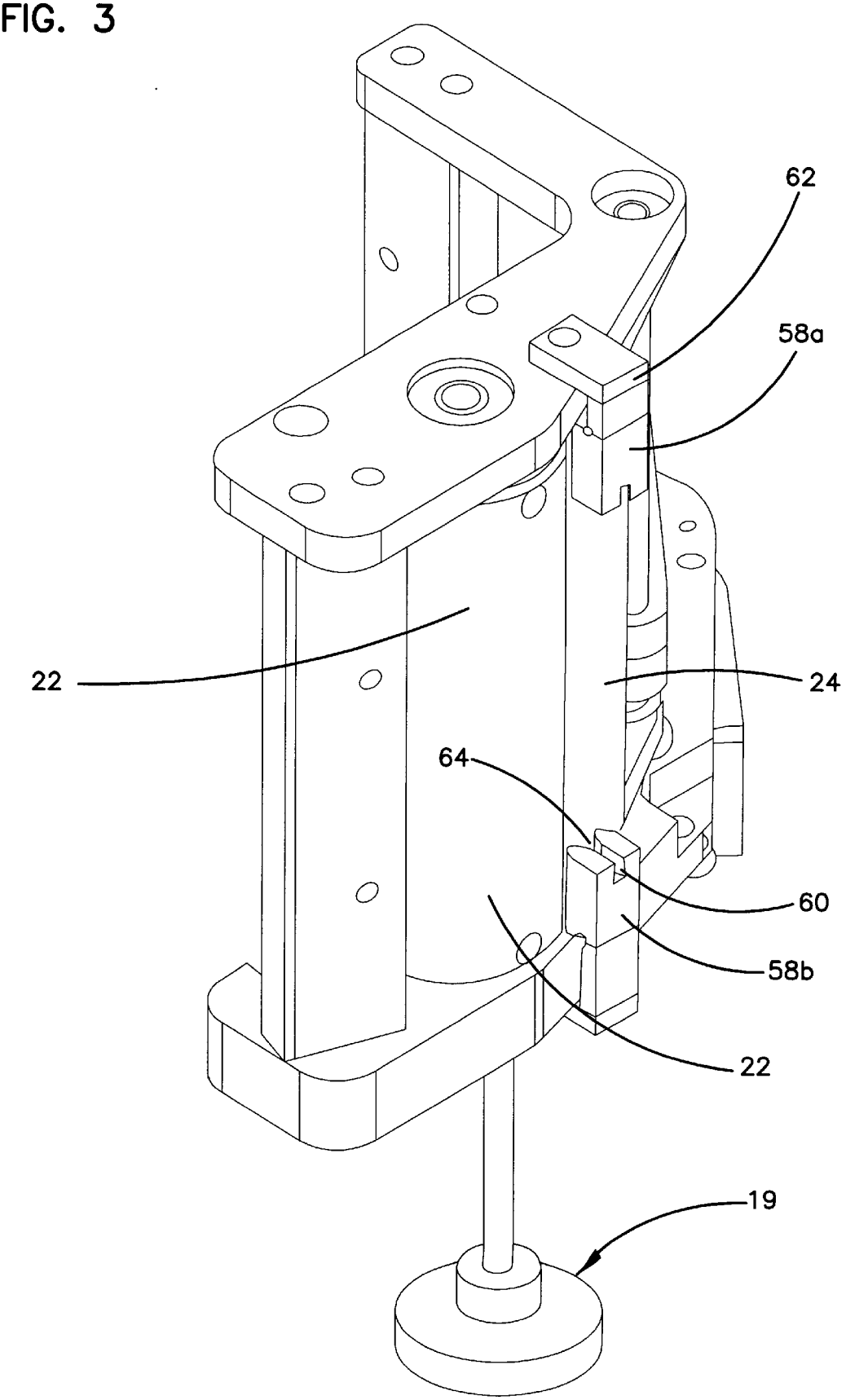
FIG. 3 is an elevated perspective view of the apparatus showing a portion of the rear of the apparatus.

As shown in FIGS. 2–3, a doctor blade 21 is fixedly secured to the spacer member 16 such that an edge thereof is disposed closely adjacent to the surface of the first roller 22 for removing material therefrom. The structure and operation of doctor blades is well known in the art, and therefore further details of the doctor blade 21 are not provided herein.

Figure 4:
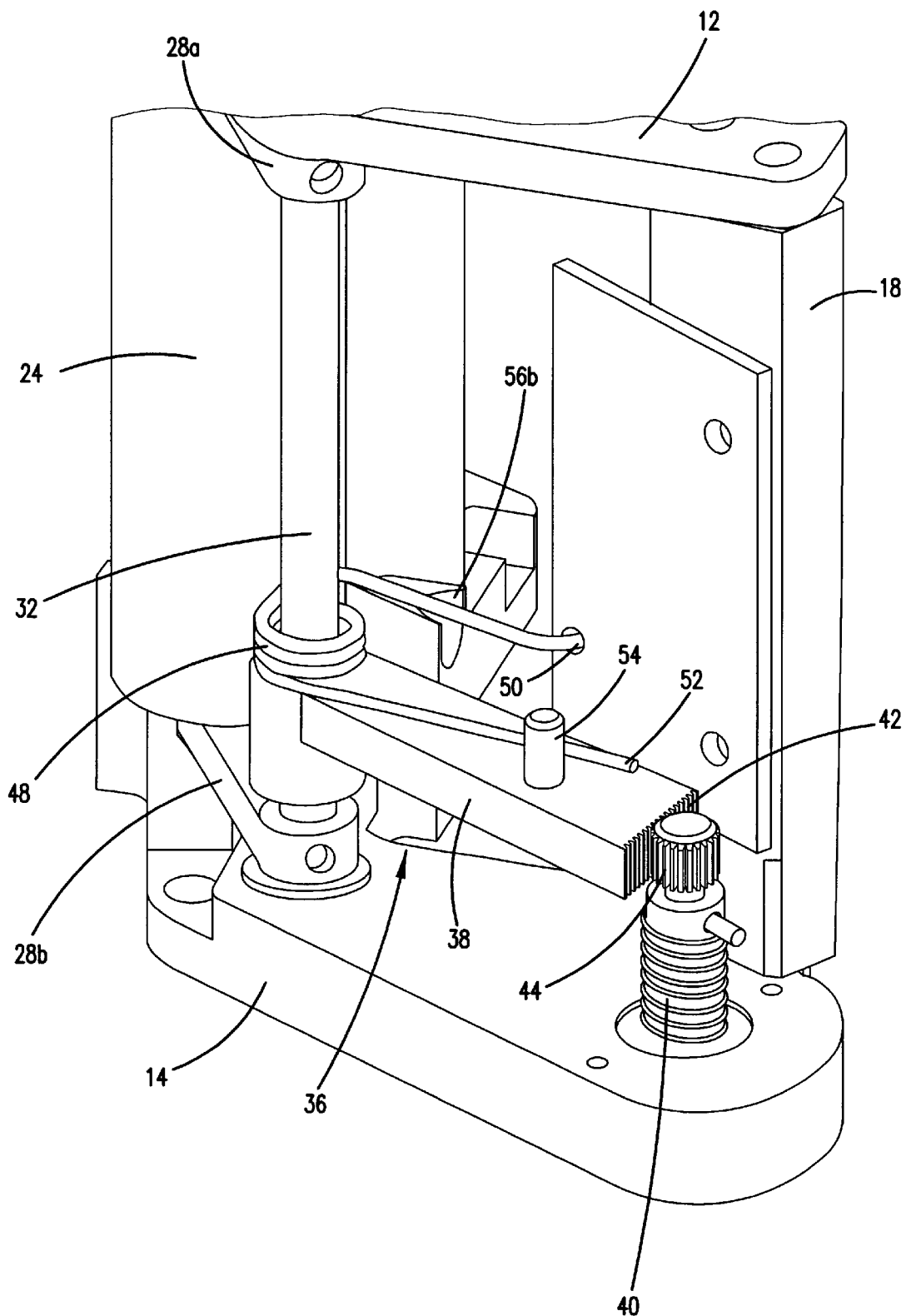
FIG. 4 is a detailed view illustrating the connection between the second roller and the encoder.

As best seen in FIGS. 2 and 4, the second roller 24 is rotatably supported at each of its ends 26,30 to first ends of first and second pivot arms 28a,28b by mounting the shaft of the second roller at the ends of the pivot arms. The pivot arms 28a,b are themselves rigidly connected at their opposite ends to a pivot shaft 32 which is pivotally supported at each of its ends in the upper and lower support members 12,14. Therefore, the second roller 24 is able to rotate about the axis of its shaft, while simultaneously being able to pivot about the axis of the pivot shaft 32 when the second roller is deflected by a contaminant on the sides surfaces of the card. Thus it is seen that the second roller "floats", acting as a sensor to detect variations in the side surfaces of the card by pivoting about the axis of the pivot shaft based on variations in the side surfaces of the card as the card travels between the two rollers. Due to the rollers being hard-surfaced and the first roller 22 being fixed, except for rotation, between the support members 12,14, when the first roller 22 encounters a contaminant or other variation on the side surface over which it rolls, the second roller 24 will be forced away from the first roller, thus pivoting about the axis of the pivot shaft. Similarly, when the second roller encounters a contaminant or other variation on the side surface over which it rolls, it will be forced away from the first roller, thus pivoting about the axis of the pivot shaft. Therefore, the second roller detects contaminants or other variations on each side surface of the card, although the second roller only directly contacts one side surface.

A spacer bar 33 is connected at each of its ends to the pivot arms 28a,b, between the second roller 24 and the pivot shaft 32 for maintaining the spacing between the arms 28a,b. A doctor blade 35 is secured in an appropriate manner to the spacer bar 33 so that an edge of the doctor blade is disposed closely adjacent to the surface of the roller 24 for removing material from the surface of the roller 24. Doctor blades are conventional structures and therefore the doctor blade 35 is not further described herein.

An encoder 34 for recording the pivoting movements of the second roller 24 is mounted on the lower support member 14 adjacent the spacer member 18. The encoder 34 is of the type that is able to collect data based upon the movements of the second roller/pivot arm/pivot shaft assembly, such as an electronic, positional Hewlett Packard, 500 pulse encoder. The encoder creates a pulse train with quadrature at a predetermined number of pulses per unit of travel. The structure and operation of electronic positional encoders are well known in the art and are therefore not described in detail herein. Other encoders or data collectors could be used as well, as long as they are able to continuously gather data on the movements of the second roller.

A transmission mechanism 36 is connected between the pivot shaft 32 and the encoder 34 for transmitting the movements of the pivot shaft, and thus the second roller, to the encoder. The mechanism 36 comprises an elongate, rigid bar 38 securely attached at one end thereof to the pivot shaft and having a second end engaged with a shaft 40 of the encoder for driving the encoder shaft as the second roller pivots. The second end of the gear 38 can either include gear teeth 42 which mesh with a gear 44 connected to the encoder shaft 40, as shown in FIG. 4, or the second end of the gear can be smooth 45 for frictionally driving a roller 46 connected to the encoder shaft, as shown in FIGS. 1–2. The transmission mechanism 36 provides the encoder with its input, by transmitting the pivoting movements of the pivot shaft to the encoder shaft 40, and thus to the encoder. The length of the bar 38 is chosen so as to provide a desired gear ratio, with alterations in the length of the bar changing the gear ratio. The bar 38 is made of a substantially rigid material, such as metal, in order to transmit the motions of the pivot shaft without flexing of the bar.

In order to maintain intimate contact between the rollers and the surfaces of the card, a coil spring 48 (shown only in FIG. 4 for sake of clarity) is disposed around the pivot shaft 32 for biasing the second roller towards the first roller. The spring 48 includes a first end 50 which is fixed to the stationary spacer member 18, and a second end 52 which contacts a peg or projection 54 extending upward from the bar 38. Thus, as can be seen, as the second roller pivots about the axis of the pivot shaft, the spring will bias the second roller back towards the first roller, due to contact between the second end 52 and the peg 54. Thus intimate contact between the card and rollers is maintained, and the second roller will be biased back toward the first roller and card after it deflects due to a variation in one of the side surfaces.

A guide system is provided to guide the card into and from the rollers. The guide system includes a first pair of inlet guide tracks 56a,b upstream, or at the inlet, of the rollers and a second pair of outlet guide tracks 58a,b downstream, or at the outlet, of the rollers. Each pair of guide tracks 56a,b and 58a,b includes spaced, upper and lower track members having channels 60 formed therein which face each other. The bottoms of the channels in each pair are spaced apart a distance approximately equal to the height of the card so as to captively guide the card into and from the rollers. The guide tracks 56a,b and 58a,b are attached to the upper and lower support members 12,14 in any suitable manner, such as with brackets 62 which are shown in FIGS. 1 and 3 connecting the tracks 58a,b to the upper and lower support members 12,14, or by being integrally attached to the support members, as shown in FIG. 2. Further, each guide track 56a,b,58a,b includes a tapered funnel or guide 64 at the inlet to each channel 60 so as to direct misaligned cards into the channels. Each guide 64 is comprised of opposite, tapered walls which taper towards the channel 60. The guides 64 are necessary because as the card approaches the apparatus 10, or starts leaving the rollers 22,24, it often times will be slightly misaligned such that the plane of the card is not parallel to the direction of movement of the card. The guides 64 thus direct the card into the channels 60 such that they are properly aligned.

Figure 5:
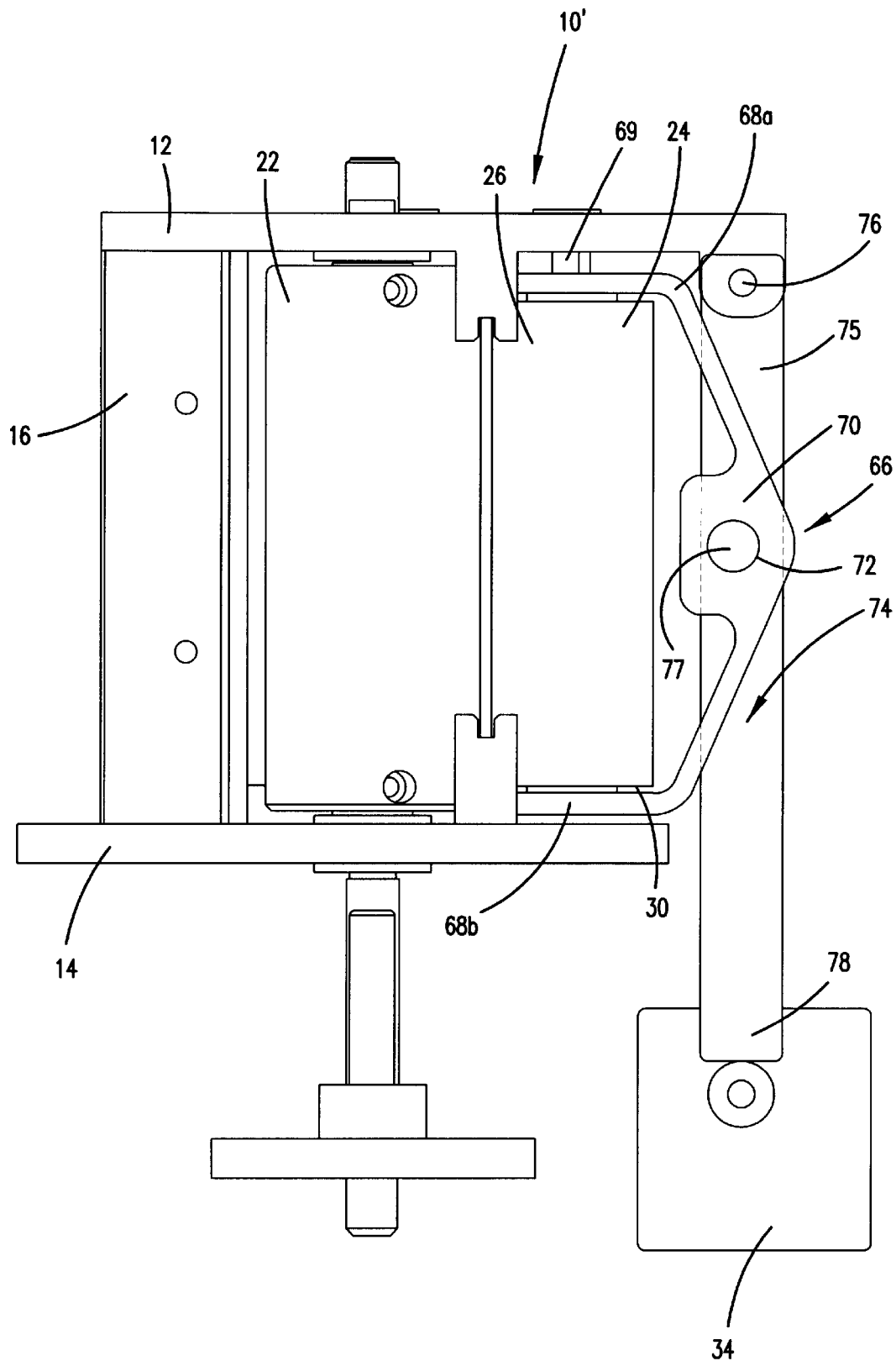
FIG. 5 is a rear view of an alternate embodiment of the apparatus.

FIG. 5 illustrate a second embodiment of a detection apparatus 10', with the same reference numerals indicating the same structure as used in the first embodiment In this embodiment, the second roller 24 is rotatably supported at each of its ends 26,30 by a C-shaped support member 66. The support member 66 includes first and second support arms 68a,68b supporting opposite ends of the shaft 69 of the second roller 24, with a solid, central region 70 connecting the arms 68a,b.

The central region 70 includes an aperture 72 therethrough for pivotally mounting the support member 66 to an elongate bar 74. The bar is pivotally connected at one end 75 by a pivot 76 to the upper support member 12 such that the bar 74 is able to pivot about the axis of the pivot 76 when the rollers encounter a contaminant on the card. A pivot pin 77 extends from the bar 74 between its two ends, and the pin 77 extends into the aperture 72 so as to allow the support member 66 to pivot relative to the bar 74. In this manner, the second roller 24 is maintained in a parallel relationship with the first roller 22, as the second roller and bar 74 pivot about the axis of the pivot 76.

The opposite end 78 of the bar 74 is in direct driving engagement with the shaft of the encoder 34. As in the first embodiment, the end 78 of the bar can either include gear teeth or be smooth, for engagement with a pinion gear or roller, respectively, connected to the shaft of the encoder. In addition, as in the first embodiment, a biasing spring can be used, such as between the bar 74 and the upper support member 12, for biasing the second roller towards the first roller. The remaining structure of this embodiment is otherwise the same as is shown in the first embodiment.

The detecting apparatus 10 operates by detecting deviations in the planar side surfaces of the card, which is reflected by a pivoting movement of the second roller. Particles or deviations exposed over a predetermined amount above either surface of the card, the predetermined amount being sufficient to damage a printhead, will cause the card to be rejected. Upon initial entrance of the card into the aforementioned nip, second, floating roller 24 is deflected away from the first roller due to the thickness of the card and causes rotation of the pivot arms 28a,b and the pivot shaft 30 about the axis of the pivot shaft 30. The pivot shaft 30 in turn rotates the bar 38, which is meshed with the encoder shaft 40 at its opposite end, thus rotating the shaft 40 and providing the encoder 34 with its input. Any particles present on either side of the card will cause further perturbations in the floating roller 24 and in turn give further input to the encoder. Particle detection is accomplished by determining the rate of change of the pulse count of the encoder. A particle is characterized by a rapid increase in the pulse count (a large deflection of the second roller) followed quickly by a rapid decrease (the second roller returning toward the first roller, aided by the bias spring 48). As the card moves between the rollers 22,24, the encoder 34 collects a series of sample points along the entire length of the card, with each sample point representing the thickness of the card at that point. Since the height of the rollers is greater than the height of the card, the entire height of each side of the card is sampled.

The apparatus 10' operates in a similar manner as the apparatus 10, except that as the rollers 22,24 engage the side surfaces of the card and one of the rollers encounters a particle, the second roller will deflect away from the first roller, and thus the bar 74 and second roller will pivot about the axis of the pivot 76. Since the bar 74 is directly engaged with the encoder, pivoting movements of the second roller and the bar 74 are input to the encoder. The pivoted connection between the support member 66 and the bar 74 permits the second roller to maintain its parallel (or vertical) alignment with the first roller as the second roller pivots about the axis of the pivot 76.

Once all sample points are collected by the encoder, they are measured statistically to determine a boolean outcome for each card. Each data point is assessed from various statistical points of view to determine its validity, with the signal to noise ratio of all data points determining if flaws, such as extrusions, exist on the side surfaces of the card.

Figure 6:
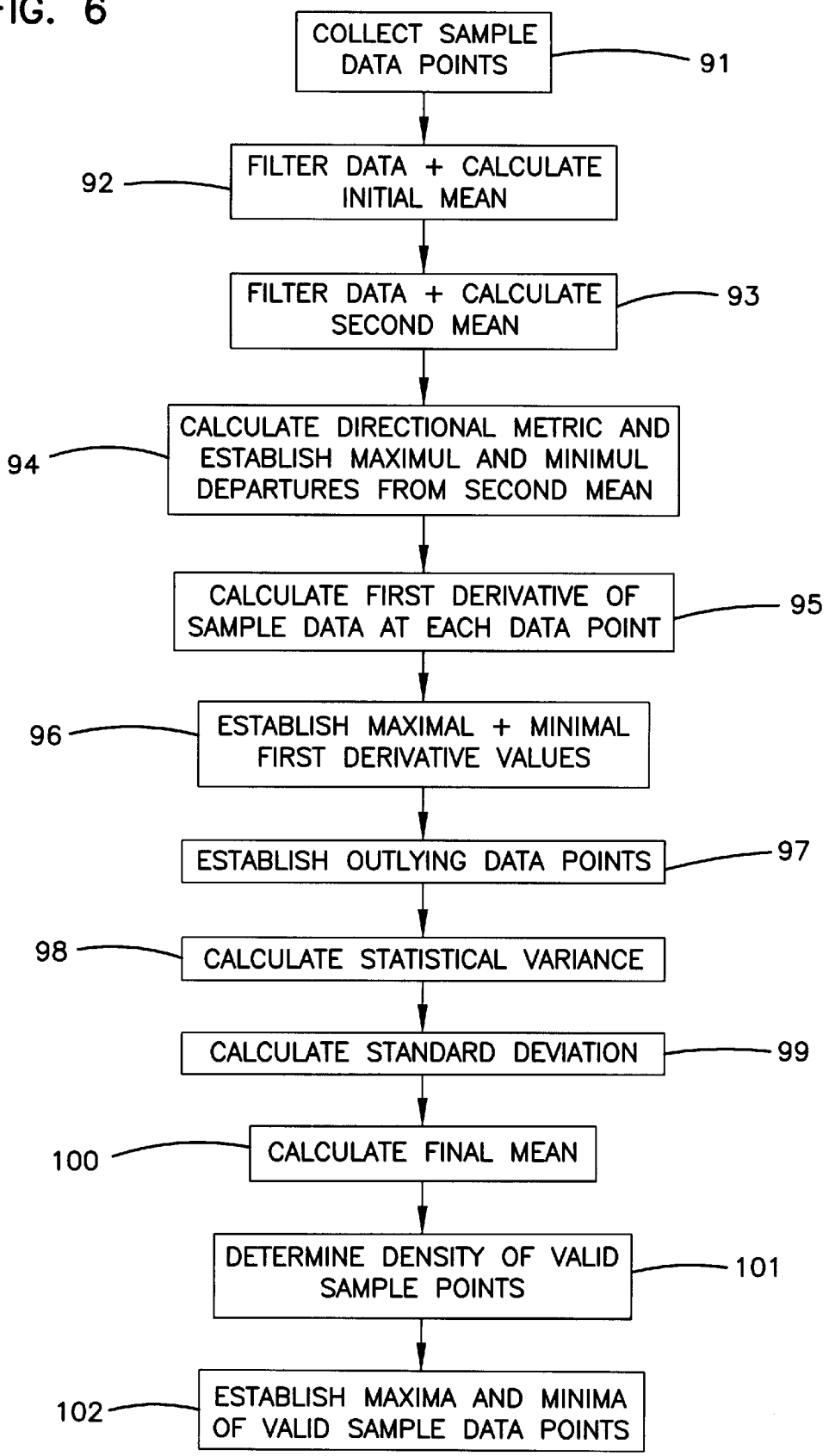
FIG. 6 shows an algorithm used in determining the presence of contaminants on the sides surfaces of the card.

The algorithm used in determining the presence of contaminants on the surfaces of the card is shown in FIG. 6, where the data is initially collected as step 91.

The analysis of the collected data includes first filtering the raw data against a low noise threshold for validity in step 92. Raw data found to be below the threshold are eliminated as being noise, and an initial mean is then calculated from the valid (non-noise) portion of the collected data.

Using the initial mean, the valid portion of the collected data is filtered again so that each point in the valid portion is weighed against the initial mean in step 93. Data values which are significantly below the initial mean are declared to be noise, and are consequently eliminated. The remaining valid data portion is then re-averaged to determine a second mean.

Using the second mean, in step 94 a directional metric (from the second mean) is calculated for each data point in the valid data portion, and maximal and minimal departures from the second mean are then determined.

Next, the first derivative (i.e. the instantaneous rate of change) of each point in the valid data portion is calculated in step 95. This is accomplished by determining the difference between each point in the valid data portion and its preceding point. Outlying data points whose first derivative is zero are dismissable as noise, however the detection apparatus corrects for this possibility by minimizing the "snow plow" rebound effect caused by a card bursting into or out of the roller assembly. Maximal and minimal first derivative values are then determined across the entire valid data portion in step 96.

In step 97, outlying data points are then calculated by filtering the valid data portion against the second mean. A point is declared an outlying point if it exists at a specific gross value above the second mean. The presence of an outlying data point provides the first indication of the presence of a possible contaminant on the surface of the card, by indicating the presence of a spike or a steep signal in the collected data. An outlying point can cause the card to be rejected. Points existing at the same specific value below the second mean are subsequently eliminated as noise.

The next step 98 is to calculate the statistical variance of the valid data portion using all non-noise data points. The variance is equal to the sum of the squared distances from the second mean divided by one less than the number of all valid data points. The standard deviation of the sample is then calculated in step 99 by determining the positive square root of the calculated variance. A card will be rejected if the calculated standard deviation reflects a population varying a specific number of Z scores or more. Since the statistical variance and the standard deviation are directly related, these two values provide an additional indication of the presence of a contaminant on the card.

A final mean is then calculated in step 100 after all noise has been eliminated from the data portion, and excluding all outlying values, i.e. those points representing extrusions or contaminants on the surface of the card. The final mean is the best determination of the average thickness of the card, excluding contaminants, and is useful for further analysis of the collected data.

Further, the number of valid data points can be assessed in step 101 to determine if the density of the valid points is sufficient to produce an effective sampling over the entire width of the card. This step basically checks the functioning of the detection apparatus 10,10' by determining whether it is collecting data points properly. An assessment that the number of valid data points is not sufficient may indicate a potential problem with the functioning of the detection apparatus. The maxima and minima of all the valid data points can also be determined in step 102.

The analysis of the collected data could include additional steps to provide additional information on the card. For instance, the analysis could include a step which would limit the analysis to a certain length of the card, i.e. to a certain subset of the collected data.

The analysis of the data collected by the encoder can be performed using suitable data analysis software provided within the control system of the card processing machine so as to determine the acceptability of a card. As should be apparent, structure will be provided downstream from the detection apparatus 10,10' so as to route a card which is rejected to the reject hopper of the card processing machine.

Although the card has been described herein as going through the detecting apparatus such that its longitudinal dimension is perpendicular to the axes of the rollers, it should be realized that the card can go through the apparatus with its longitudinal axis parallel to the axes of the rollers without changing the scope of the invention.

It is to be understood that while certain embodiments of the present invention have been illustrated and described, the invention is not limited to the specific forms or arrangements of the parts described and shown.

What is claimed:

1. An apparatus for detecting contaminants on side surfaces of a generally planar card as the card travels through the apparatus, comprising:

a roller assembly including a first, driven, rotatable roller and a second, floating, rotatable roller parallel to the first roller, the card being directed between the first and second rollers whereby the first roller is engageable with one side surface of the card and the second roller is engageable with the opposite side surface of the card;

means supporting the second roller to permit the second roller to pivot about a fixed axis when either one of the first and second rollers encounters a contaminant on the side surfaces of the card; and an encoder connected to said supporting means for recording the movement of said second roller.

2. The apparatus according to claim 1, further including guide tracks for guiding the planar card into and from the first and second rollers, said guide tracks orienting the planar card such that the plane defined thereby is substantially parallel to a longitudinal axis of each of the first and second rollers.

3. The apparatus according to claim 2, wherein said guide tracks include a first pair of spaced, inlet guide tracks upstream of the first and second rollers and a second pair of spaced, outlet guide tracks downstream of the first and second rollers.

4. The apparatus according to claim 3, wherein said first pair of inlet guide tracks and said second pair of outlet guide tracks comprise track members with channels formed therein, said channels of each pair of said guide track members facing each other with a bottom of the channels of each pair being spaced apart a distance approximately equal to a width of the card.

5. The apparatus according to claim 4, wherein each said guide track member includes means for guiding an edge of the card into said channel.

6. The apparatus according to claim 1, wherein the second roller includes first and second ends, and said means for supporting comprises first and second pivot arms rotatably supporting the first and second ends of the second roller, respectively, adjacent one end of the first and second pivot arms, and opposite ends of each of the first and second pivot arms are fixedly connected to a pivot shaft that is rotatably supported at opposite ends thereof by a stationary portion of the apparatus.

7. The apparatus according to claim 6, further comprising a transmission mechanism connected between the pivot shaft and the encoder for transmitting movements of the pivot shaft to the encoder.

8. The apparatus according to claim 7, wherein said transmission mechanism comprises a gear operatively engaged with the pivot shaft and the encoder such that pivoting movements of the pivot shaft are transmitted by the gear to the encoder.

9. The apparatus according to claim 8, wherein said gear comprises an elongate bar rigidly connected at one end to the pivot shaft and having an opposite end engaged with the encoder.

10. The apparatus according to claim 9, wherein the opposite end of the bar includes gear teeth, said gear teeth engaging with a gear connected to the encoder.

11. The apparatus according to claim 9, wherein the opposite end of the bar is smooth and frictionally engages a roller gear connected to the encoder.

12. The apparatus according to claim 9, further including biasing means for biasing the second roller in a direction toward the first roller.

13. The apparatus according to claim 12, wherein said biasing means comprises a spring.

14. The apparatus according to claim 13, wherein said spring is a coil spring disposed around the pivot shaft, said coil spring having a first end that is fixed to a stationary portion of the apparatus and a second end that is engaged with the elongate bar.

15. The apparatus according to claim 6, further including a spacer bar connected at opposite ends thereof to said first and second pivot arms, said spacer bar being disposed between said second roller and said pivot shaft, and a doctor blade secured to said spacer bar for removing material from the surface of said second roller.

16. The apparatus according to claim 1, wherein the second roller includes first and second ends, and said means for supporting comprises a support member rotatably supporting the first and second ends of the second roller, and an elongate member pivotally secured at one end thereof to a stationary portion of the apparatus.

17. The apparatus according to claim 16, wherein the support member is pivotally secured to the elongate member.

18. The apparatus according to claim 17, wherein the support member includes first and second support arms rotatably supporting the first and second ends, respectively, of the second roller, and a central portion that is pivotally secured to said elongate member.

19. The apparatus according to claim 16, wherein said elongate member is drivingly engaged at a second end thereof with the encoder.

* * * * *